(12) United States Patent
Kotani

(10) Patent No.: US 6,335,842 B1
(45) Date of Patent: Jan. 1, 2002

(54) MAGNETIC RECORDING APPARATUS WITH A HEAD ERROR DETECTION CIRCUIT

(75) Inventor: Takumi Kotani, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/136,967

(22) Filed: Aug. 20, 1998

(30) Foreign Application Priority Data

Aug. 20, 1997 (JP) .............................. 9-223357

(51) Int. Cl.[7] .............................. G11B 5/09; G11B 15/46
(52) U.S. Cl. ...................................... 360/53; 360/73.03
(58) Field of Search .............................. 360/48, 53, 66, 360/47, 31, 25, 73.03

(56) References Cited

U.S. PATENT DOCUMENTS

| | | | | |
|---|---|---|---|---|
| 5,612,933 A | * | 3/1997 | Iso et al. ....................... | 369/32 |
| 5,754,355 A | * | 5/1998 | Nakamura et al. ........ | 360/73.03 |
| 6,043,945 A | * | 3/2000 | Tsuboi et al. ................. | 360/53 |
| 6,049,439 A | * | 4/2000 | Ono et al. ..................... | 360/46 |

FOREIGN PATENT DOCUMENTS

| | | |
|---|---|---|
| JP | 63-121171 | 5/1988 |
| JP | 1-196767 | 8/1989 |
| JP | 1-253802 | 10/1989 |
| JP | 3-52160 | 3/1991 |
| JP | 4-137259 | 5/1992 |
| JP | 4-313864 | 11/1992 |
| JP | 5-109007 | 4/1993 |
| JP | 5-325143 | 12/1993 |
| JP | 11-16129 | 1/1999 |

* cited by examiner

Primary Examiner—Regina Y. Neal
(74) Attorney, Agent, or Firm—Young & Thompson

(57) ABSTRACT

The present invention provides a magnetic recording apparatus for recording/reproducing a data with a comparatively high density. The magnetic recording apparatus comprises: a magnetic recording medium having a data area and a spare area; a head for data write in the data area with a predetermined recording frequency; a head error detection circuit for detecting a head error during a data write; and a controller that operates as follows. When an error is detected by the head error detection circuit, a data write is carried out in the spare area and if this does not cause an error, it is decided that the head is normal.

11 Claims, 8 Drawing Sheets

FIG.8a

| WE | FP | OUTPUT |
|----|----|--------|
| L | L | L |
| L | H | L |
| H | L | L |
| H | H | H |

FIG.8d

| M1 | S2 | OUTPUT |
|----|----|--------|
| L | L | L |
| L | H | L |
| H | L | L |
| H | H | H |

FIG.8b

| A | B | OUTPUT |
|---|---|--------|
| L | L | L |
| L | H | L |
| H | L | H |
| H | H | L |

FIG.8e

| M1 | S2 | OUTPUT |
|----|----|--------|
| L | L | H |
| L | H | L |
| H | L | H |
| H | H | H |

FIG.8c

| Q1 | Q2 | OUTPUT |
|----|----|--------|
| L | L | L |
| L | H | L |
| H | L | L |
| H | H | H |

FIG.8f

| M2 | B21 | OUTPUT |
|----|-----|--------|
| L | L | L |
| L | H | H |
| H | L | H |
| H | H | H |

MAGNETIC RECORDING APPARATUS WITH A HEAD ERROR DETECTION CIRCUIT

BACKGROUND OF THE INVENTION

1. Field of the Invention

The present invention relates to a magnetic recording apparatus and in particular, to a magnetic recording apparatus for recording and reproducing data with comparatively high density. The present invention also relates to a head error detection apparatus for detecting an error caused by a magnetic head for writing and in particular, to a program product for detecting a head error.

2. Description of the Related Art

Conventionally, a magnetic recording apparatus comprises a head drive circuit including a head error detection circuit for detecting a head error such as a write magnetic head disconnection and a short-circuit.

In general, the head error detection circuit detects a voltage level of reverse electromotive force pulse generated at a head current switching and compares the value detected with a reference value. When a head error such as disconnection and short-circuit is caused, the voltage level of the reverse electromotive force pulse does not reach the reference value. Upon detection of this small voltage, the error detection circuit generates a fault pulse signal, which causes a magnetic recording apparatus to enter an interrupt mode in which no data recording is carried out.

The head error detection circuit executes a write unsafe (WUS) check. A WUS check circuit has an inherent frequency characteristic and cannot operate in response to a frequency above a predetermined frequency band. Moreover, WUS check circuits of an identical type may differ in the frequency characteristic. To cope with this, in general, a head portion of a data area contains a signal of a single frequency, i.e., ½ or ⅓ of the maximum frequency, and the area where this signal is written serves as an object of the WUS check. This area to be checked will be referred to as a "WUS check area".

Explanation will be given of a conventional head error detection circuit disclosed in Japanese Patent Publication (Unexamined) No. A-4-313864. In this circuit a recording current is reduced because an apparatus using this circuit has a high efficiency, low-floating head. This results in a low frequency data write which is normal but regarded as an error. To cope with this, the aforementioned head detection circuit changes the area subjected to the write unsafe (WUS) check. This prevents a malfunction and enables correct execution of the WUS check.

These years, the magnetic recording apparatus has increased its data transfer rate and write frequency, which in turn requires strict conditions of overwrite and non-linear bit shift. Accordingly, depending on the recording frequency, the head error detection circuit has a higher sensitivity, which increases the frequency of malfunctions caused by a noise overlaid in a power source and grinding line or inductance. If the head error detection circuit operates incorrectly, an error is detected and a write operation is interrupted even when the apparatus is in a normal state.

SUMMARY OF THE INVENTION

It is therefore an object of the present invention to provide an improved magnetic recording apparatus capable of preventing a malfunction to decide a normal apparatus as an error.

Another object of the present invention is to provide a magnetic recording apparatus capable of carrying out a stable recording operation, irrespective of the recording frequency change.

In the magnetic recording apparatus according to the present invention, when a head error is detected, a data write is retried with a recording frequency different from a normal recording frequency. More specifically, the data write is retried with a recording frequency higher or lower than the normal recording frequency. If no error is detected in this retrial, a write operation is resumed in a data area. This prevents incorrect an decision that the apparatus which should be normal is not in a normal state. Moreover, it is possible to carry out, at a write check or apparatus rise, a data write with a recording frequency different from a normal recording frequency, irrespective of a head error.

BRIEF DESCRIPTION OF THE DRAWINGS

FIG. 8A to FIG. 8F show operations of respective sections of the gate array.

DESCRIPTION OF THE PREFERRED EMBODIMENTS

Description will now be directed to an embodiment of the present invention with reference to the attached drawings.

Figure 1:
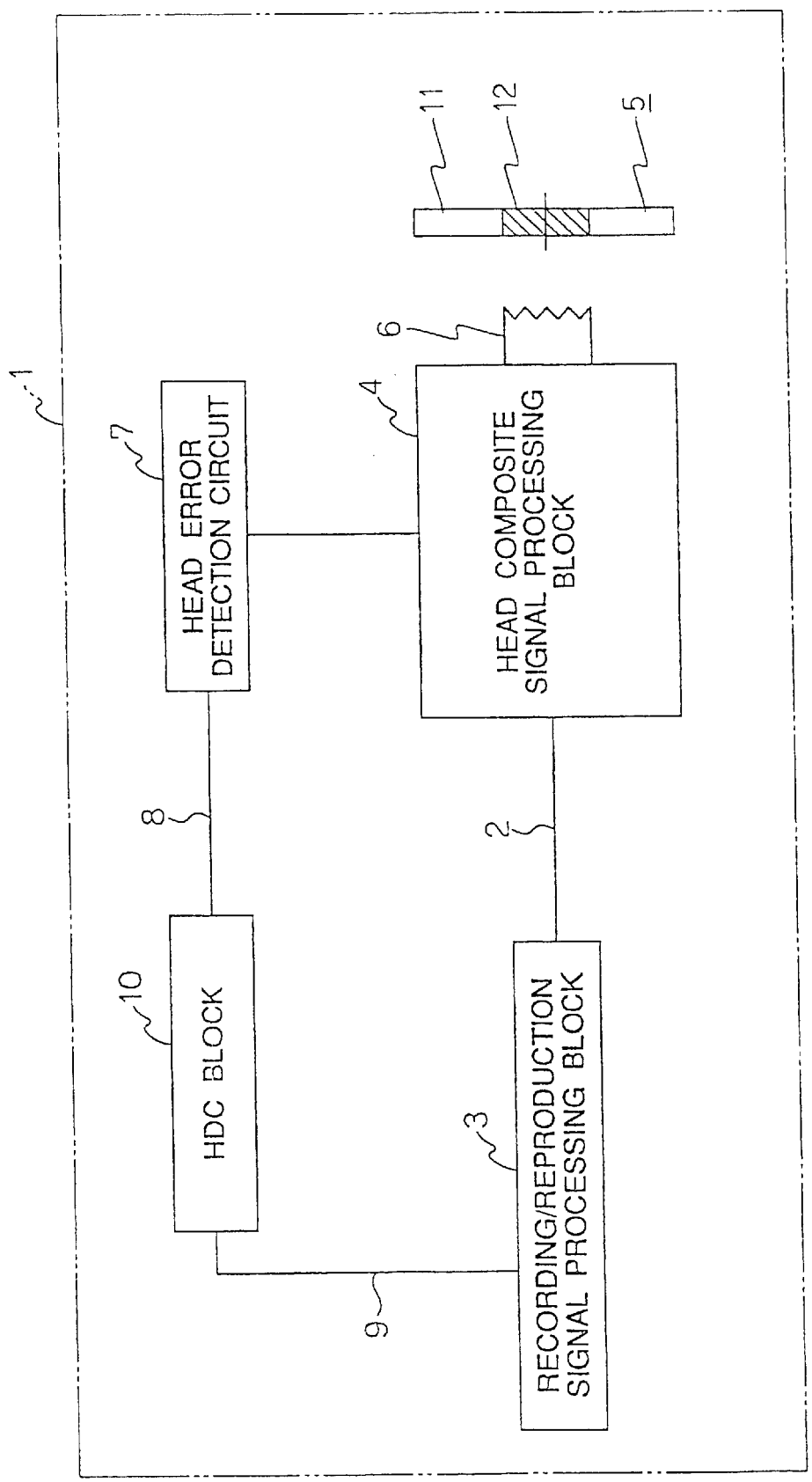
FIG. 1 is a block diagram showing a configuration of an essential portion of a magnetic recording medium according to an embodiment of the present invention.

Referring to FIG. 1, the magnetic recording apparatus 1 according to the present embodiment of the present invention comprises: a recording/reproduction signal processing block 3 for generating write data (WD) 2; a head composite signal processing block 4 for rectifying the WD 2; a head 6 for outputting a signal from the head composite signal processing block 4 to a medium 5; a head error detection circuit 7 for deciding whether a current flows to the head 6; and a hard disc controller (HDC) 10 that receives an error signal 8 generated by the head error detection circuit 7 when a head error is caused, and that controls a write gate (WG) 9 in the recording/reproduction signal processing block 3. The medium 5 has a data area 11 for recording and reproducing a data and a spare area 12 (shaded by slanting lines in the figure) to be used for rewrite trial.

Figure 2:
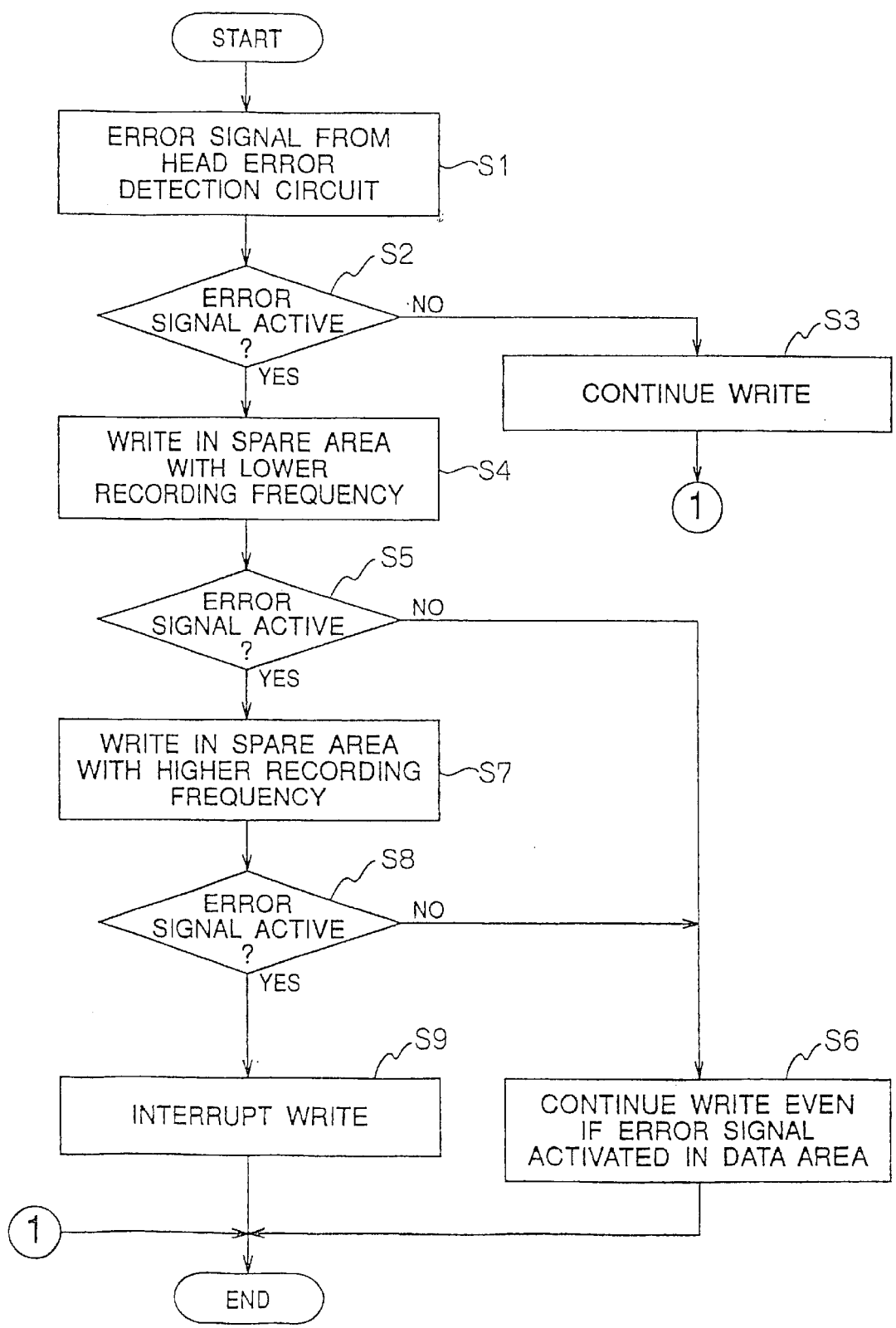
FIG. 2 is a flowchart showing an operation of the magnetic recording apparatus of FIG. 2.

Explanation will now be given on the operation of this magnetic recording apparatus with reference to a flowchart of FIG. 2.

When a head error is detected by the head error detection circuit 7, the head error detection circuit 7 generates an error signal 8 (step S1). The HDC block 10 monitors this error signal 8. If the error signal 8 is not active, then there is no problem in normal writing, and the write operation is continued (step S2, step S3). When the error signal 8 has become active, a write is carried out into the spare area with a reduced recording frequency (step S2, step S4). If this does not activate the error signal 8, there is no problem of disconnection or short-circuit, and the write operation is continued in the data area even if the error signal 8 is active in the data area (step S5, step S6).

On the other hand, if the error signal 8 is active in the spare area, a write is tried in the spare area with increased recording frequency. If this does not activate the error signal 8, there is no problem of disconnection or short-circuit, and the write operation is continued in the data area even if the error signal 8 is active in the data area (step S8, step S6). If the aforementioned activates the error signal 8 in the spare area, it is decided that a write defect, i.e., disconnection or short-circuit is caused, and the writing operation is interrupted (step S8, step S9).

Figure 3:
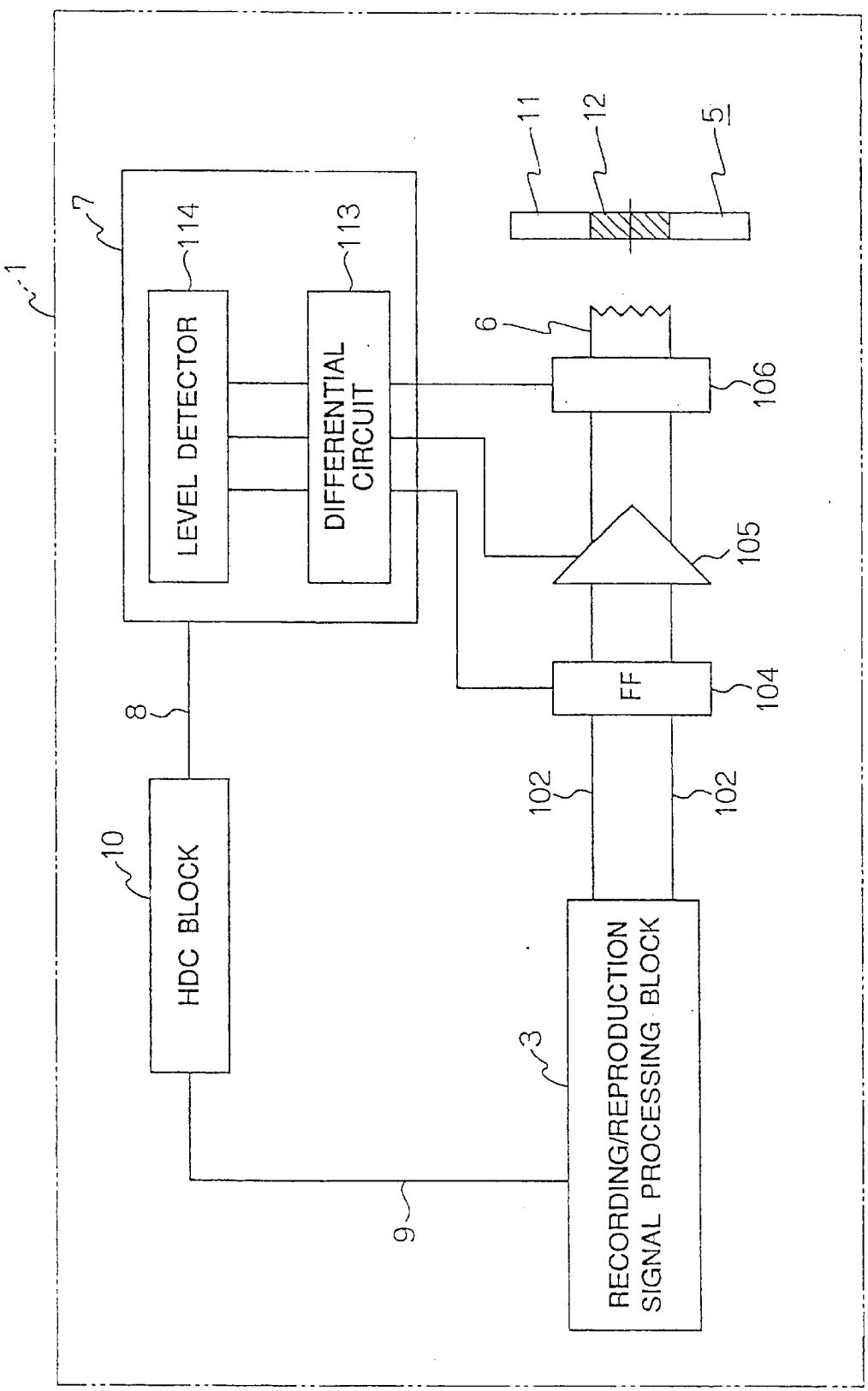
FIG. 3 is a block diagram showing a configuration of an essential portion of a magnetic recording apparatus according to another embodiment of the present invention.

Referring to FIG. 3, the magnetic recording apparatus 1 according to the present embodiment of the present invention comprises a recording/reproduction signal processing block 3 for generating a differential write data (WD) pulse signal 102; a flip-flop (FF) 104 for shaping the differential WD pulse signal 102; and a write driver 105 for controlling a write current.

Moreover, in the example shown in FIG. 3, the magnetic recording apparatus further comprises a head composite signal processing block 106 for supplying an output signal from the driver 105, to write head 6; the write head for outputting the supplied signal to the medium 5; head detection circuit 7 for deciding whether a current is flowing to this write head 6 (whether a disconnection or short-circuit has been caused), according to an output from the head composite signal processing block 106; and HDC block 10 that receives a fault pulse signal 8 which becomes active by a head error outputted from this head error detection circuit 7, so as to control write gate (WG) 9 including a write operation stop in the recording/reproduction signal processing block 3.

The head error detection circuit 7, in addition to the check of disconnection or short-circuit of the write head 6, carries out a check of an output from the FF 104 and a check of an output form the write driver 105, and comprises a differential circuit 113 for differentiating three pulse outputs in total and a level detector 114 for detecting their outputs.

Figure 4:
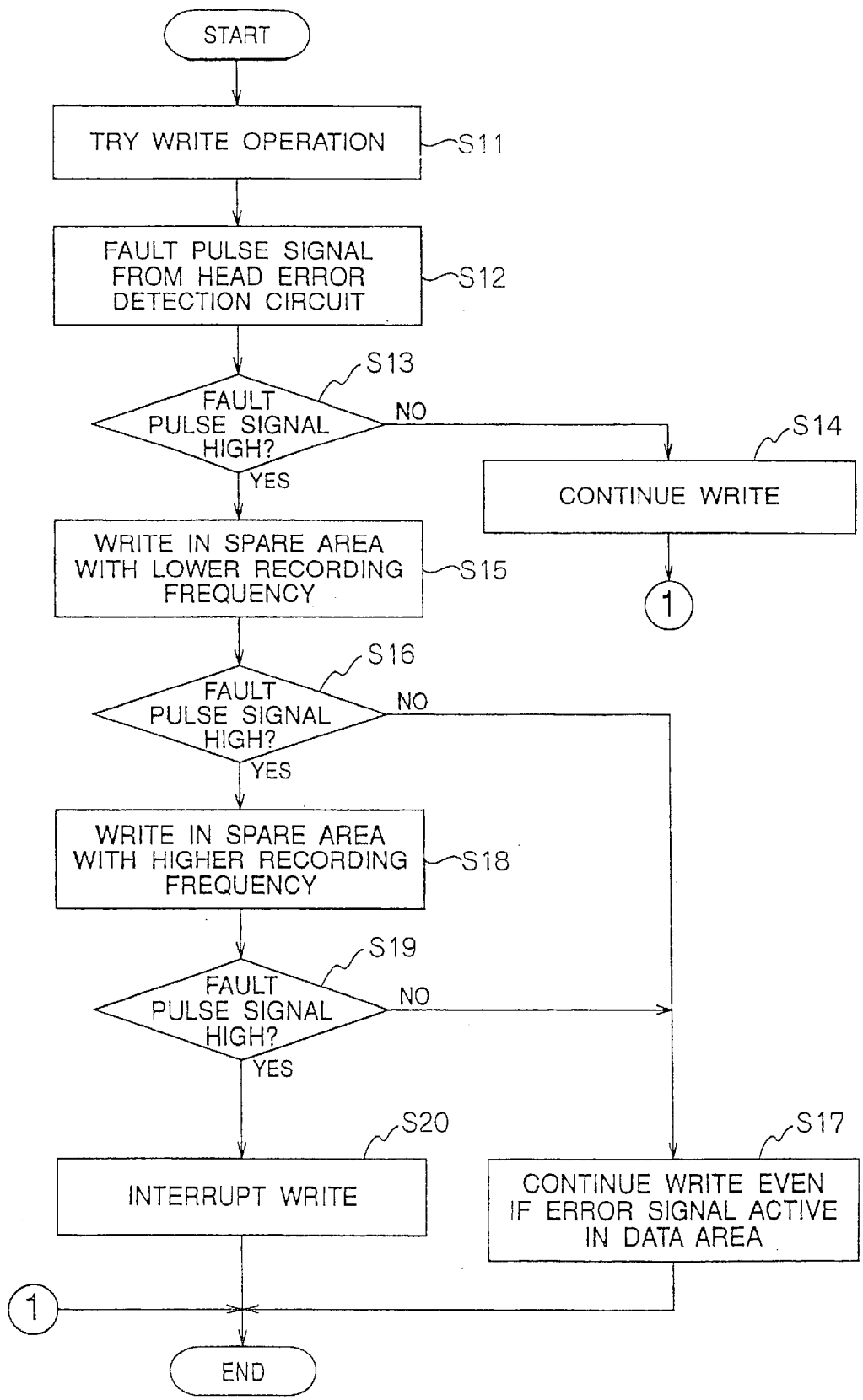
FIG. 4 is a flowchart showing an operation of the magnetic recording apparatus of FIG. 4.

Next, the operation of the apparatus shown in FIG. 3 will be explained with reference to a flowchart of FIG. 4.

At step S11, during a normal operation, a data write is tried, so as to check whether outputs from the FF 104, the write driver 105, and the write head 6 show differential levels that are correct or incorrect (step S12). If the outputs are correct, the head error detection circuit 7 generates a Low level fault pulse signal 8. If the outputs are incorrect, the head error detection circuit 7 generates a High level fault pulse signal 8. The HDC 10 monitors the fault pulse signal 8. If the fault pulse signal 8 is at Low level, there is no problem in writing, and the writing operation is continued (step S13, step S14). On the other hand, if the signal 8 is at High level, a write is tried in the spare area with a reduced recording frequency (step S15). If this results in a Low level of the fault pulse signal 8, there in no problem of disconnection or short-circuit and the write operation is continued even if the fault pulse signal 8 is High in the data area (step S16, step S17).

On the other hand, if the fault pulse signal 8 becomes High, a write is carried out in the spare area with an increased recording frequency (step S18). If this results in Low level of the fault pulse signal 8, there is nor problem of disconnection or short-circuit and the write operation is continued even if the fault pulse signal 8 is High in the data area (step S19, step S17).

If the fault pulse signal 8 is at High level at the final stage, it is decided that a write defect, i.e., a disconnection or short-circuit defect is caused and the write operation is interrupted.

As has been described above, in the magnetic recording apparatus according to the present embodiment, when a head error is detected by the head error detection circuit, a write interrupt is not caused at once, but the HDC block serving as a control block retries a write in an area other than the data area so as to check whether an error has been actually caused.

More specifically, when an error is detected, an error signal is generated by the head error detection circuit. If the error signal is active, a write is retried out of the data area with a reduced recording frequency (step S4 in FIG. 2) and a write is retried out of the data area with an increased recording frequency (step S7 in FIG. 2). If at this stage the error signal from the head error detection circuit is non-active, the write operation is continued even if the error signal is active in the data area (step S6 in FIG. 2). If the error signal is active, the write is interrupted.

It should be noted that it is also possible to carry out a write in the spare area with a recording frequency different from the normal recording frequency without waiting for a detection result from the head error detection circuit. For example, during a write check or when turning on the apparatus, it is possibly to firstly carry out a write in the spare area with an increased or decreased recording frequency. In this case, unless the head error detection circuit 7 outputs the fault pulse signal 8 which is active, it is decided that no error of disconnection of short-circuit is present, and the write operation is continued even if an error is detected during a normal write operation.

Here, explanation will be given on the differential circuit 113 and the level detection circuit 114 with reference to FIG. 5.

Figure 5:
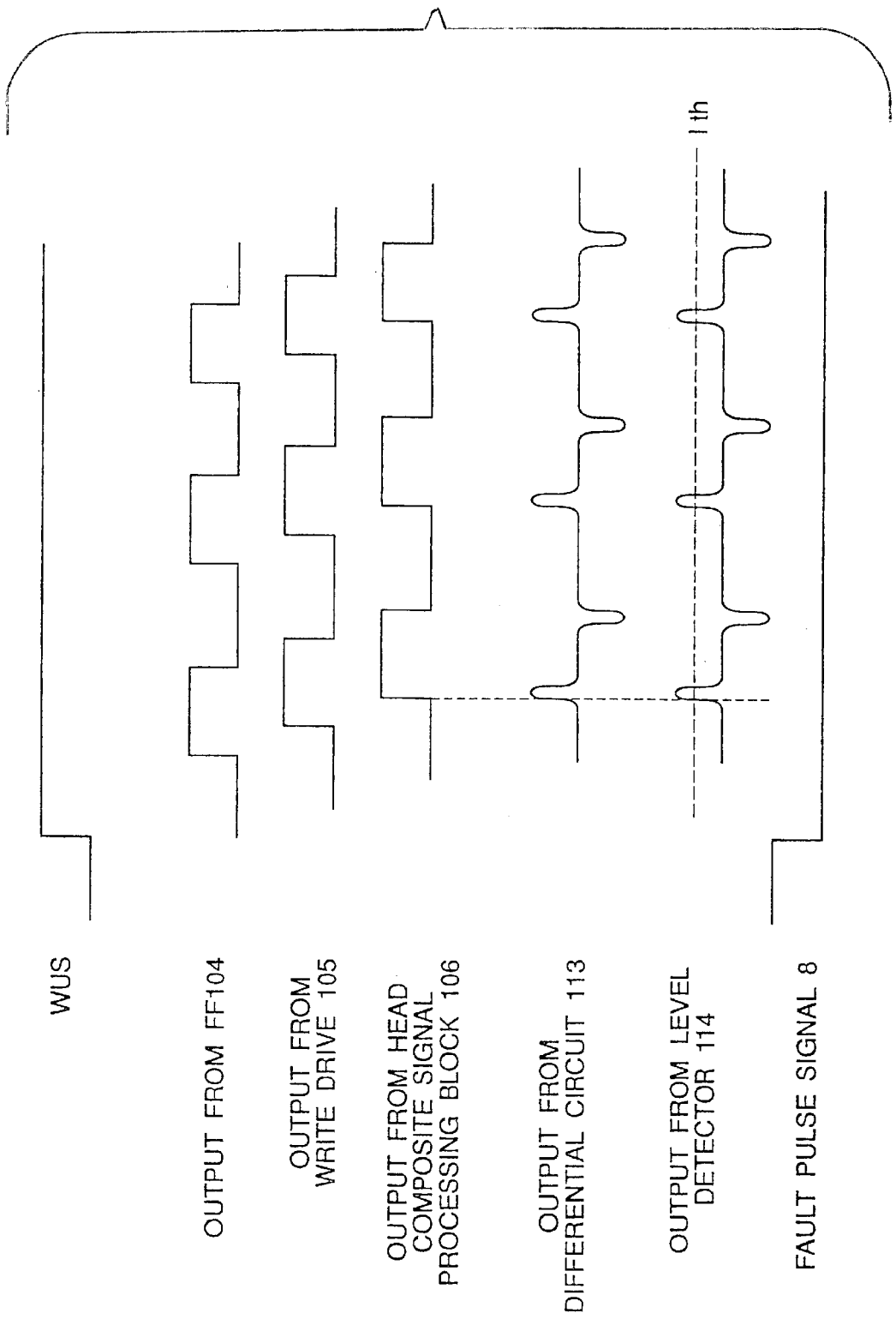
FIG. 5 shows waveforms illustrating operations of a differential circuit and a level detection circuit in FIG. 3.

In FIG. 5, the differential circuit 113 and the level detection circuit 114 operate during a period while the WUS signal is High, i.e., in the WUS check area. As shown here, a rectangular write signal passes through the FF 104, the write driver 105, and the head composite signal processing block 106 in this order. Outputs from these FF 104, the write driver 105, and the head composite signal processing block 106 are fed to the differential circuit 113, which in turn outputs differentiated waveforms.

The head composite signal processing block 105 outputs a signal which, after differentiation by the differential circuit 113, has a waveform as shown in the figure. The outputs from the FF 104 and the write driver 105 after differentiation by the differential circuit 113 also have similar waveforms (not depicted). The output of the differential circuit 113 is fed to the level detection circuit 114 and compared to a predetermined threshold current value Ith. It should be noted that the threshold current value Ith is assumed to be a positive value.

If the output from the differential circuit 113 exceeds this threshold current value Ith, then it can be decided that there is no problem in the apparatus. In this case, the fault pulse signal 8 is kept as Low level.

On the contrary, if the output of the differential circuit 113 does not exceed the threshold current value Ith, it is decided that a disconnection or short-circuit is present. In this case, the fault pulse signal 8 is changed to the High level.

It should be noted that as the recording frequency increases, the amplitude is expected to be reduced. In this case, the threshold current value Ith is not exceeded and the fault pulse signal 8 is changed to the High level. Moreover, when a noise is overlaid, the threshold current value Ith may not be exceeded.

Next, explanation will be given on an internal configuration example of the HDC block in FIG. 1, with reference to FIG. 6.

Figure 6:
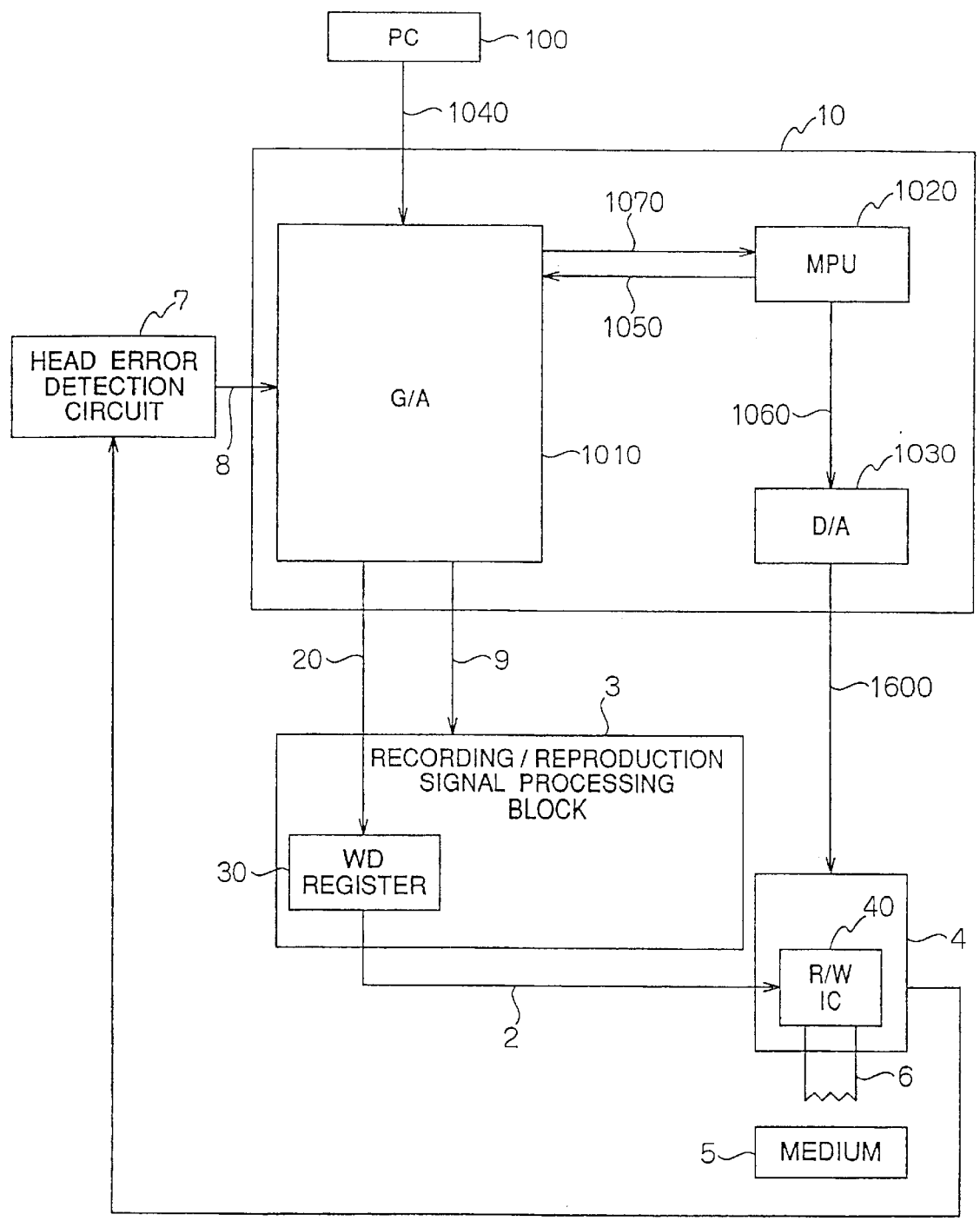
FIG. 6 is a block diagram showing an internal configuration example of an HDC (hard disc controller) block of FIG. 1.

As shown in FIG. 6, the HDC block 10 comprises: a gate array (G/A) 1010 constituting a logical circuit; a micro processing unit (MPU) 1020 for outputting a digital signal 1060 for controlling the head composite signal processing block 4; and a D/A converter 1030 for converging the digital signal 1060 from the PMU 1020, into an analog signal 1600.

The gate array 1010 is supplied with the fault pulse signal 8 from the head error detection circuit 7, a write instruction signal 1040 from a personal computer (PC) 100 or the like, and a positioning confirmation signal 1050 from the MPU 1020. The gate array 1010 outputs a radial direction positioning signal 1070, a write gate signal 9, and a write data signal 20. The gate array 1010 has an internal logical circuit constituted to output these signals corresponding to the aforementioned inputs signals.

The write data signal 20 outputted from the gate array 1010 is temporarily stored in a write data (WD) register 30 in the recording/reproduction signal processing block 3, and is outputted as it is as a write data signal 2. This write data signal 2 is fed to a read/write (E/W) IC 40 in the head composite signal processing block 4, so as to drive the write head 6. It should be noted that the read/write IC 40 is assumed to have the functions of the aforementioned FF104, the write driver 105, and the head composite signal processing block 106 in FIG. 3.

The head composite signal processing block 4 is assumed to be controlled to be shifted in a radial direction of the medium 5 by an analog signal 1600 produced by the D/A converter circuit 1030.

In this configuration, when the fault pulse signal 8 has become active, the gate array 1010 outputs a radial direction positioning signal 1070. In response to this signal, the MPU 1020 outputs a digital signal 1060. This digital signal 1060 is converted by the D/A converter circuit 1030 into an analog signal 1600, which is fed to the head composite signal processing block 4. This causes a current to flow in a coil (not depicted) in the head composite signal processing block, so that the head 6 is moved to a position corresponding to the spare area of the medium 5.

Moreover, if the fault pulse signal 8 becomes active when a positioning confirmation signal 1050 is supplied from the MPU 1020, the gate array 1010 outputs a write data signal 20 for making the recording frequency higher than usual.

This signal 20 is s stored in the write data register 30 in the recording/reproduction signal processing block 3, so as to be fed as a write data signal 2 to the head composite signal processing block 4. Thus, a data is written on the medium 5 with a higher recording frequency than usual.

If the fault pulse signal 8 has become active several times while the data write with the higher recording frequency is carried out, the gate array 1010 out puts a write data signal 20 for lowering the recording frequency than usual. The signal 20 is stored in the write data register 30 in the recording/reproduction signal processing block 3 and fed as a write data signal 2 to the head composite signal processing block 4 so that a data is written onto the medium 5 with the lower recording frequency than usual.

If the fault pulse signal 8 has become active further several times, it is decided that the head has an error and the write operation is finally interrupted.

Figure 7:
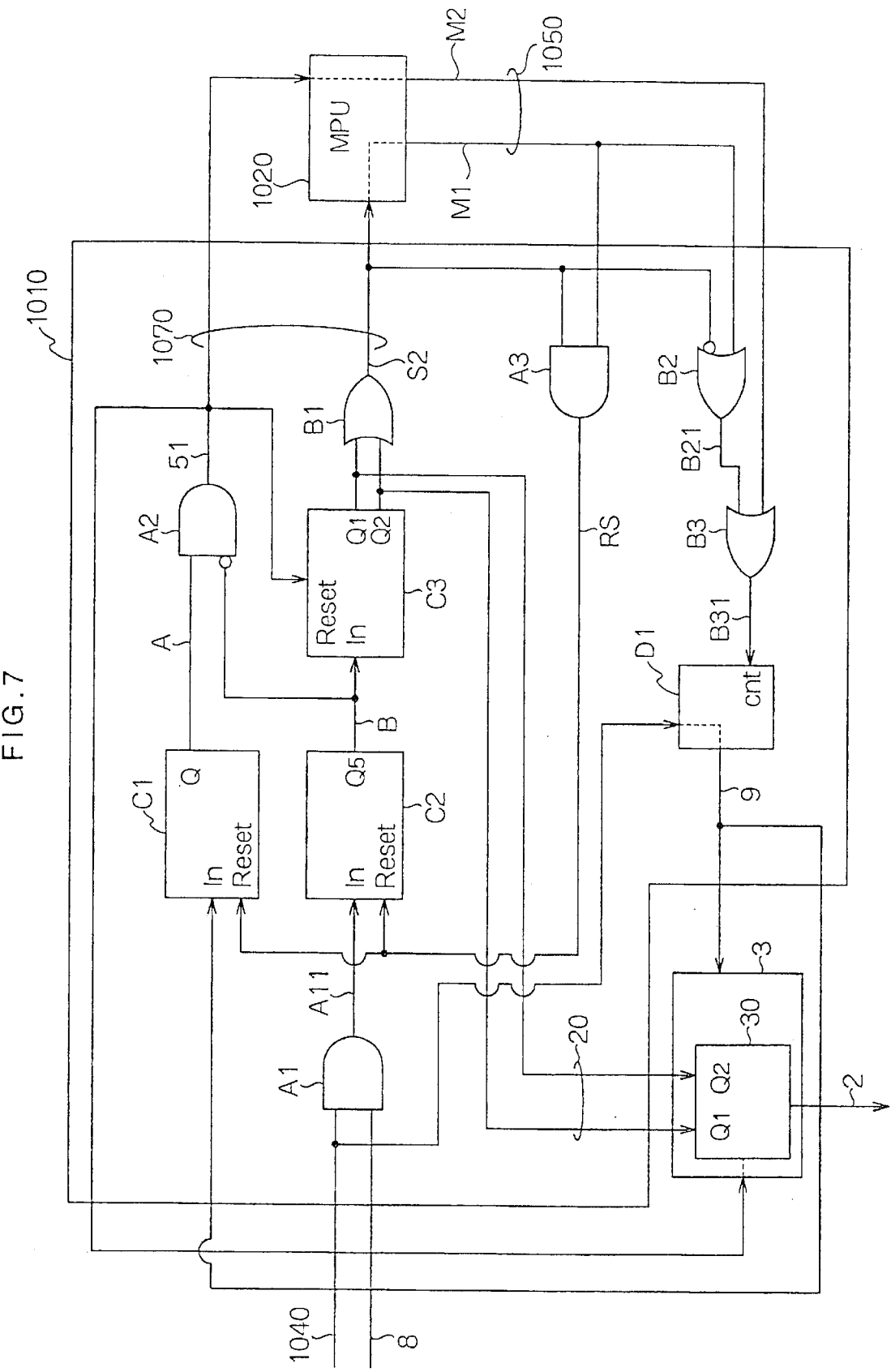
FIG. 7 is a circuit diagram showing a configuration example of a gate array in FIG. 6.

Next, explanation will be given on a logical circuit constituting the gate array (G/A) 1010 in FIG. 6, with reference to FIG. 7. In FIG. 7, like components as in FIG. 1 and FIG. 3 are denoted by like symbols and their explanations are omitted.

Referring to FIG. 7, the gate array 1010 includes an AND gate A1 supplied with the write instruction 1040 and the fault pulse signal 9; a counter C1 supplied with a write gate signal 9; and a counter C2 supplied with an output A11 from the AND gate A1. The counter C1 has ten T-type flip-flop (TFF) connected in series. That is, the counter C1 outputs a signal A when the input level transition has occurred 100 times. The counter C2 has five D-type flip-flop (DFF) connected in series, and its most significant bit Q5 is outputted as a signal B.

Moreover, the gate array 1010 further includes an AND gate A2 supplied with the output A from the counter C1 and the output B from the counter C2; a counter C3 supplied with the output B of the counter C2; an OR gate B1 supplied with an output of two bits (Q1, A2) of the counter; an AND gate A3 and an OR gate B2, each of which is supplied with an output S2 from the OR gate B1 and an output M1 from the MPU 1020; an OR gate B3 supplied with an output B21 from the OR gate B2 and an output M2 from the MPU 1020; and a flip-flop D1 that is supplied with an output B31 from the OR gate B3 as a control input and that stores a write instruction 1040. The output of the AND gate A3 is supplied as a reset signal RS to the reset terminals of the counter C1 and the counter C2. The output from the flip-flop D1 is supplied as a write gate signal 9 to the recording/reproduction signal processing block 3 as well as to the counter C1.

The output S1 of the AND gate A2 and the output S2 of the OR gate B1 are supplied as the aforementioned radial direction positioning signal 1070 to the MPU 1020. The outputs M1 and M2 from the MPU 1020 are supplied as the aforementioned positioning confirmation signal 1050 to the gate array 1010.

Description will now be directed to the operation of the respective components of the gate array 1010 having the aforementioned configuration with reference to FIG. 8. It should be noted that in FIG. 8, "H" represents a high level and "L" represents a low level.

FIG. 8A shows an operation of the AND gate A1. If the write instruction (WE) 1040 is high and the fault pulse signal (FP) 8 is high, it is decided that an error has occurred and the output A11 becomes high.

FIG. 8B shows an operation of the AND gate A2. If the output B of the counter C2 remains low (no problem) until the output A of the counter C1 becomes high (the write gate signal has caused the level transition a hundred times), the output S1 becomes high. This output S1 is supplied to the MPU 1020, which in turn controls to carry out a data write in the normal data area.

FIG. 8C shows an operation of the OR gate B1. If one of the outputs Q1 and Q2 from the counter C2 is high, it is decided that an error has occurred and an output S2 is transmitted to the MPU 1020. The MPU controls to carry out a data write in the spare area, i.e., an area other than the normal data area. AT this moment, the outputs Q1 and Q2 from the counter C3 are fed as a write data 20 to the recording/reproduction signal processing block 3 and stored in the register 30. It should be noted that a control is executed here as follows: if the output Q1 is high level, the recording frequency is lowered and if the output Q2 is high, the recording frequency is increased.

FIG. 8D shows an operation of the AND gate A3. As shown here, when an output S2 constituting a part of the radial direction positioning signal 1070 is transmitted to the MPU 102, the output S2 is also supplied to the AND gate A3. When the AND gate A3 is supplied with the S2 and the confirmation signal M1 indicating that the head 6 has been positioned in the spare area outside the data area, the AND gate A3 outputs a reset signal RS for resetting the counter C1 and the counter C2.

FIG. 8E shows an operation of the OR gate B2. If the output S2 constituting a part of the radial direction positioning signal 1070 is low and the confirmation signal M1 transmitted to the MPU 120 indicating that the head 6 has been positioned in the spare area out of the data area is low, then no error is detected and the output B21 is high for continuing the write operation. Moreover, if the output S2 is high and the signal M1 is low, an error has been detected but the head 6 has not been moved. Accordingly, the output B21 becomes low to interrupt the write operation. Furthermore, if the output S2 is low and the signal M1 is high, the head has been moved and no error has been detected in the following step (a step of writing with a reduced recording frequency). Accordingly, the output B21 is high for continuing the write operation. Moreover, if the output S2 and signal M1 are both high, the head 6 has been moved and the output B21 becomes high for resuming the write operation in the following step (a step of writing with a reduced recording frequency).

FIG. 8F shows an operation of the OR gate B3. If the output B21 and the confirmation signal M2 are both low, the output B31 is low in the same way as in FIG. 8E. Furthermore, if the signal M2 is high and the output B21 is low or high, the output B31 is high for continuing the write operation.

It should be noted that if a program to realize the aforementioned gate array processing of FIG. 7 and FIG. 8 is recorded on a recording medium so as to control a computer, the aforementioned operations can be executed. This recording medium may be a magnetic recording medium, semiconductor memory, or other recording media not shown in FIG. 6.

As has been described above, if an error signal is generated by the head error detection circuit, a write is retried in a spare area outside a data area with a reduced recording frequency. Accordingly, unless the error signal becomes active, there is no problem of disconnection or short-circuit. That is, a malfunction of the head error detection circuit will not affect the write operation. If the error signal becomes active again, a write is retried in a spare area outside the data area with an increased recording frequency. Thus, it is possible to check whether a head has a problem of disconnection or short-circuit. If no such problem is present, it is possible to continue the write operation. Thus, the present apparatus enables to twice check whether a malfunction of the head error detection circuit is caused. That is, check is carried out by decreasing and increasing the recording frequency, thus enhancing the find-out probability of the malfunction of the head error detection circuit.

In general, as the recording frequency increases, a signal is deteriorated, causing an erroneous error detection of the head error detection circuit. In the present apparatus, a write is retried firstly with a reduced recording frequency. Thus, it is possible to rapidly detect an error of the head itself.

Moreover, in a magnetic recording apparatus, the head error detection circuit changes its sensitivity depending on the recording frequency, and its frequency characteristic is affected by a high transfer rate, overlaid noise, inductance, and the like. Accordingly, the head error detection circuit erroneously detects an error, irrespective of a head error such as disconnection or short-circuit. Consequently, by changing the recording frequency, it is possible to carry out a head error detection in a less strict, i.e., more stable condition. In the present apparatus, even if a head error is detected during a normal write operation, it is possible to retry a data write in a spare area outside a data area with a modified recording frequency, so as to confirm whether the error has been detected erroneously. This contributes to increasing the apparatus production yield.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 9-223357 (Filed on Aug. $20^{th}$, 1997) including specification, claims, drawings and summary are incorporated herein by reference in its entirety.

What is claimed is:

1. A magnetic recording apparatus comprising:

a magnetic recording medium;

a head for writing a data in a recording area of said magnetic recording medium with a predetermined recording frequency;

a head error detection circuit for detecting an error caused by said head during a data write; and a controller for rewriting said data in an area other than said recording area if an error is detected by said head error detection circuit, and deciding that said head has no error if no error is caused by said rewrite, wherein said controller modifies said predetermined recording frequency when carrying out said rewrite.

2. A magnetic recording apparatus as claimed in claim 1, wherein said controller carries out said rewrite with a recording frequency lower than said predetermined recording frequency.

3. A magnetic recording apparatus as claimed in claim 1, wherein said controller carries out said rewrite with a recording frequency higher than said predetermined recording frequency.

4. A magnetic recording apparatus comprising:

a magnetic recording medium having a data area and a spare area out of said data area;

a head for writing a data with a recording frequency predetermined for said magnetic recording medium;

a head error detection circuit for detecting an error caused by said head during a data write; and a controller for driving said head so as to write said data in said medium and deciding whether to interrupt or continue said writing according to an output of said head error detection circuit, wherein said controller causes said apparatus to:
monitor an error signal from said error detection circuit;
if said error signal is active, write said data in said spare area with a recording frequency lower than said predetermined recording frequency,
if said error signal becomes inactive in said write with said lower recording frequency, continue said write in said data area even if the error signal becomes again active.

5. A magnetic recording apparatus as claimed in claim 4, wherein said controller further causes said apparatus to:
if said error signal remains active in said write with said lower recording frequency, write said data with a recording frequency higher than said predetermined recording frequency in said spare area;
if said error signal becomes inactive in said write with said higher recording write, continue said write even if said error signal becomes again active; and
if said error signal remains active in said write with said higher recording frequency, interrupt said data write.

6. A magnetic recording apparatus as claimed in claim 4, wherein said controller causes said apparatus to start a data write in said spare area with a recording frequency lower than said predetermined recording frequency when the apparatus is turned on.

7. A magnetic recording apparatus as claimed in claim 4, wherein said head error detection circuit compares a current flowing in said head with a threshold value and outputs said error signal if said current is smaller than said threshold value.

8. A magnetic recording apparatus comprising:
a magnetic recording medium having a data area and a spare area out of said data area;
a head for writing a data with a recording frequency predetermined for said magnetic recording medium;
a head error detection circuit for detecting an error caused by said head during a data write; and
a controller for driving said head so as to write a data in said medium and deciding whether to interrupt or continue said write according to an output of said head error detection circuit,
wherein said controller includes:
means for monitoring an error signal from said error detection circuit;
means for writing a data in said spare area if said error signal is active, with a recording frequency lower than said predetermined recording frequency, and
means for continuing write in said data area in response to inactivation of said error signal in said write with said lower recording frequency, even if the error signal becomes again active.

9. A magnetic recording apparatus as claimed in claim 8, said controller further comprising:
means for writing a data in said spare area with a recording frequency higher than said predetermined recording frequency if said error signal remains active in said write with said lower recording frequency;
means for continuing a data write in said data area in response to inactivation of said error signal in said write with said higher recording frequency even if said error signal again becomes active in said data area; and
means for interrupting said data write if said signal remains active in said write with said higher recording frequency.

10. A computer program product stored on a computer readable medium for controlling write operation of a magnetic recording apparatus comprising a magnetic recording medium having a data area and a spare area, a head for a data write in said data area with a predetermined recording frequency, a head error detection circuit for detecting an error of said head during a data write, and a controller for controlling operations of said head and said head error detection circuit according to said program,
wherein said computer program causes said magnetic recording apparatus to
monitor an error signal produced from said error detection circuit;
if said error signal is active, retry a data write in said spare area with a recording frequency lower than said predetermined recording frequency; and
continue said data write in said data area in response to inactivation of said error signal in said data write with said lower recording frequency, even if said error signal becomes active in said data area.

11. A computer program product as claimed in claim 10, wherein said program further causes said apparatus to:
write a data in said spare area with a recording frequency higher than said predetermined recording frequency if said error signal remains active in said write with said lower recording frequency;
continue a data write in said data area in response to inactivation of said error signal in said write with said higher recording frequency even if said error signal again becomes active in said data area; and
interrupt said data write if said signal remains active in said write with said higher recording frequency.

* * * * *